(12) United States Patent
Egozi

(10) Patent No.: US 6,464,267 B1
(45) Date of Patent: Oct. 15, 2002

(54) PIPE COUPLING

(75) Inventor: Yigaal Moshe Egozi, Natania (IL)

(73) Assignee: Plasson Ltd., Ma'agan Michael (IL)

( * ) Notice: Subject to any disclaimer, the term of this patent is extended or adjusted under 35 U.S.C. 154(b) by 0 days.

(21) Appl. No.: 09/529,621

(22) PCT Filed: Oct. 19, 1998

(86) PCT No.: PCT/IL98/00499

§ 371 (c)(1),
(2), (4) Date: Apr. 19, 2000

(87) PCT Pub. No.: WO99/20931

PCT Pub. Date: Apr. 29, 1999

(30) Foreign Application Priority Data

Oct. 19, 1997 (IL) .................................................. 121997

(51) Int. Cl.⁷ ................................................ F16L 21/02
(52) U.S. Cl. ...................................... 285/342; 285/340
(58) Field of Search ................................ 285/340, 342, 285/105, 104; 138/37

(56) References Cited

U.S. PATENT DOCUMENTS

| | | | | |
|---|---|---|---|---|
| 1,699,591 A | * | 1/1929 | Jennings | ................. 285/340 X |
| 2,064,140 A | * | 12/1936 | Appleton | ..................... 285/340 |
| 2,100,796 A | * | 11/1937 | Church | ........................ 285/340 |
| 2,475,741 A | * | 7/1949 | Goeller | ................... 285/342 X |
| 3,074,747 A | * | 1/1963 | Boughton | ............... 285/342 X |
| 3,429,596 A | * | 2/1969 | Marshall | ..................... 285/340 |
| 3,679,241 A | * | 7/1972 | Hoffmann | .................... 285/340 |
| 4,022,499 A | * | 5/1977 | Holmes et al. | ......... 285/340 X |
| 4,655,486 A | * | 4/1987 | Tarnay et al. | ................ 285/340 |
| 4,964,657 A | * | 10/1990 | Gonzales | ................ 285/340 X |
| 5,351,998 A | * | 10/1994 | Behrens et al. | ......... 285/342 X |
| 6,145,893 A | * | 11/2000 | Kuo | ........................ 285/342 X |

FOREIGN PATENT DOCUMENTS

GB        2210123        *   1/1989   ............. 285/340 X

* cited by examiner

Primary Examiner—Eric K. Nicholson
Assistant Examiner—David E. Bochna
(74) Attorney, Agent, or Firm—G.E. Ehrlich Ltd.

(57) ABSTRACT

A pipe coupling includes a housing and a conical split ring which is compressed to firmly clamp a pipe received within the housing. The opposite ends of the split ring defining the split are laterally offset from each other such as to permit the split ring to be compressed to substantially decrease its internal diameter, by the offset ends moving in overlapping relation to each other, thereby enabling the split ring to clamp pipes having a wide range of outer diameters.

16 Claims, 7 Drawing Sheets

FIG. 4
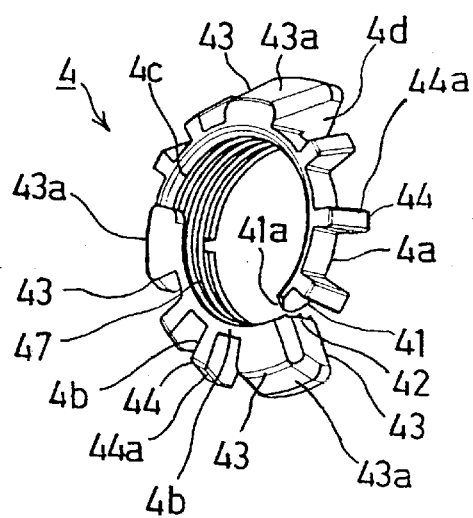
FIG. 5
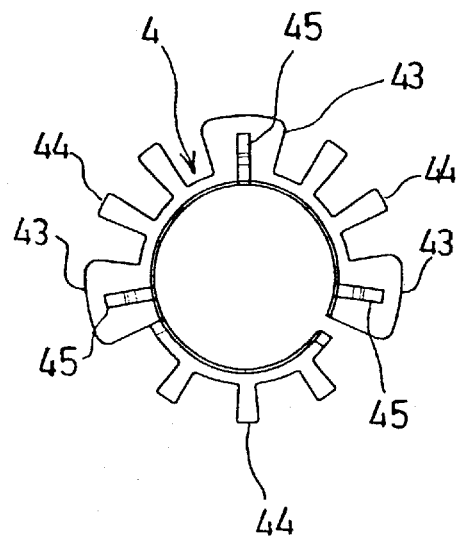
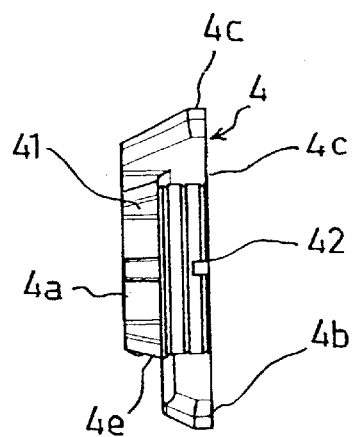
FIG. 6
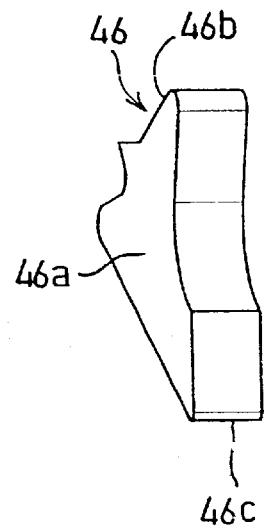
FIG. 7

PIPE COUPLING

FIELD AND BACKGROUND OF THE INVENTION

The present invention relates to pipe couplings. The invention is particularly useful in a universal-type pipe coupling adapted to receive a wide range of pipe sizes and materials. The invention is therefore described below particularly as applied to the universal-type pipe coupling, but it will be appreciated that the invention could also be used in other applications.

Pipe couplings in general must receive a precise predetermined length of the pipe and must securely hold the pipe against large pull-out forces. In addition, where the pipes are used for conducting liquids or gasses particularly at high pressures, the pipe coupling must also assure a good seal to prevent leakage. For these reasons, pipe couplings are generally constructed in a wide range of sizes and of different designs to accommodate pipes of different diameters and materials.

Various constructions of universal-type pipe couplings have been developed to enable the pipe coupling to accommodate a wide range of pipe sizes. Examples of the presently-known couplings of this type are described in patent application PCT/GB93/02630, published Jul. 7, 1994, and in U.S. Pat. No. 3,986,737, issued Oct. 19, 1976.

An object of the present invention is to provide a pipe coupling having a number of advantages making it especially useful as a universal-type pipe coupling, as will be described more particularly below.

The present invention relates particularly to the type of pipe coupling comprising a housing including a first section formed with a bore for receiving a pipe to be coupled, and a second section attachable to the first section and movable axially thereof to fix the pipe within the bore; and an elastic split ring received within the second section for enclosing the pipe to be coupled, the split ring having an outer conical face engageable with an inner conical face of the second section and effective, upon moving the second section axially to fix the pipe within the bore, to compress the split ring such as to decrease its internal diameter and thereby to cause the split ring to firmly clamp an enclosed pipe.

According to one aspect of the present invention, there is provided a pipe coupling, comprising: a housing including a first section formed with a bore for receiving a pipe to be coupled, and a second section attachable to the first section and movable axially thereof to fix the pipe within the bore; the second section of the housing being a nut formed with a bore for receiving the pipe to be coupled; the nut being a unitary member formed at one end with threads for attachment to the first section, and being reduced in diameter at its opposite end to define an inner conical face; and an elastic split ring received within the nut for enclosing the pipe to be coupled, the split ring having an outer conical face engageable with the inner conical face of the nut and effective, upon moving the nut axially to fix the pipe within the bore, to compress the split ring such as to decrease its internal diameter and thereby to cause the split ring to firmly clamp an enclosed pipe; the opposite ends of the split ring defining the split thereof being laterally offset from each other, in the unstressed condition of the split ring and having flat inner and outer faces, such as to permit the split ring to be compressed to substantially decrease its internal diameter, by the offset ends moving in overlapping relation to each other, thereby enabling the split ring to clamp pipes having a wide range of outer diameters.

According to further features in the described preferred embodiment, the first section is a a body member formed with the bore for receiving the pipe to be coupled; and the split ring is of a plastic material and formed with a plurality of axially-extending, cicumferentially-spaced ribs having outer tapered surfaces definning the outer conical face.

It will thus be seen that such a construction assures that the pipe coupling will grip the pipe for substantially the complete 360° circumference of the pipe, irrespective of the pipe diameter. This construction therefore permits the pipe coupling to be manufactured according to a standard size, or a relatively small number of standard sizes, each standard size being able to accommodate a large number of pipe diameters. Such a feature relieves the user from the necessity of stocking a large number of parts for different pipe diameter sizes, and substantially reduces the costs of initial tooling, production, maintenance and repair.

According to another aspect of the present invention there is provided a pipe coupling, comprising a housing including a first section formed with a bore for receiving a pipe to be coupled, and a second section attachable to first section and movable axially thereof to fix the pipe within the bore; and an elastic split ring received within the second section for enclosing the pipe to be coupled, the split ring being formed with a plurality of axially-extending, circumferentially-spaced ribs having outer tapered surfaces defining an outer coni al face engageable with an inner conical face of the second section and effective, upon moving the second section axially to fix the pipe within the bore, to compress the split ring such as to decrease its internal diameter and thereby to cause the split ring to firmly clamp an enclosed pipe; the split ring including a plurality of hard teeth fixed within at least some of the axiallly-extending, circumferentially-spaced fibs and projecting radially inwardly past in inner face of the split ring, at circumferential spaced locations thereof, which teeth become embedded in the outer face of a pipe when enclosed and clamped by the split ring.

The invention is herein described, by way of example only, with reference to the accompanying drawings, wherein:

FIG. 4 is a three-dimensional view illustrating the split ring in the pipe coupling of FIGS. 1–3;

FIG. 5 is a view of the split ring of FIG. 4 from its larger-diameter end;

FIG. 6 is a side view of the split ring of FIG. 4;

FIG. 7 is an enlarged perspective view illustrating one of the hard teeth inserts in the pipe coupling of FIGS. 1–3;

Figure 1:
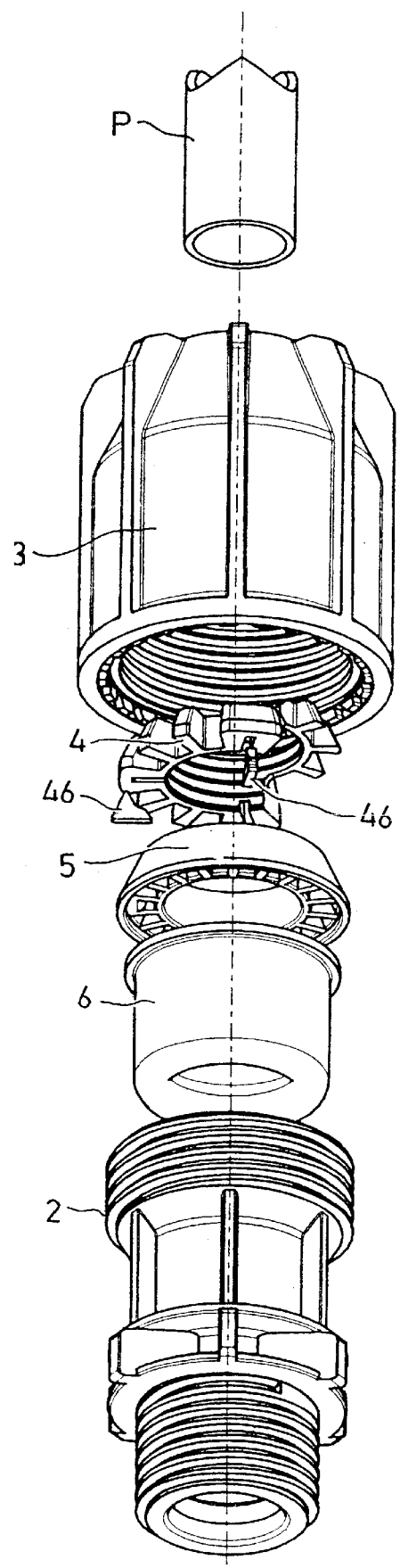
FIG. 1 is an exploded three-dimensional view illustrating the main components of one form of pipe coupling constructed in accordance with the present invention.

The drawings illustrate a pipe coupling constructed in accordance with the present invention for coupling one end of a pipe P to another device (not shown) in a manner which securely holds the pipe against large pull-out forces, and which also produces a good seal against leakage of the fluid carried by the pipe. The pipe coupling illustrated in the drawings, for example, could be one end of an in-line coupling or elbow coupling, in which case the pipe P would be coupled in-line to another pipe, or it could be one part of a T-fitting, in which case the pipe P would be coupled at an angle to another pipe, outlet tap or other device.

The illustrated pipe coupling includes five main components: a first housing section in the form of a body member 2; a second housing section in the form of a nut 3 threadedly received on the body member; a split-ring 4 for clamping the pipe P when received within the coupling; an abutment ring 5; and a sealing ring 6 for sealing the pipe within the coupling.

Figure 3:
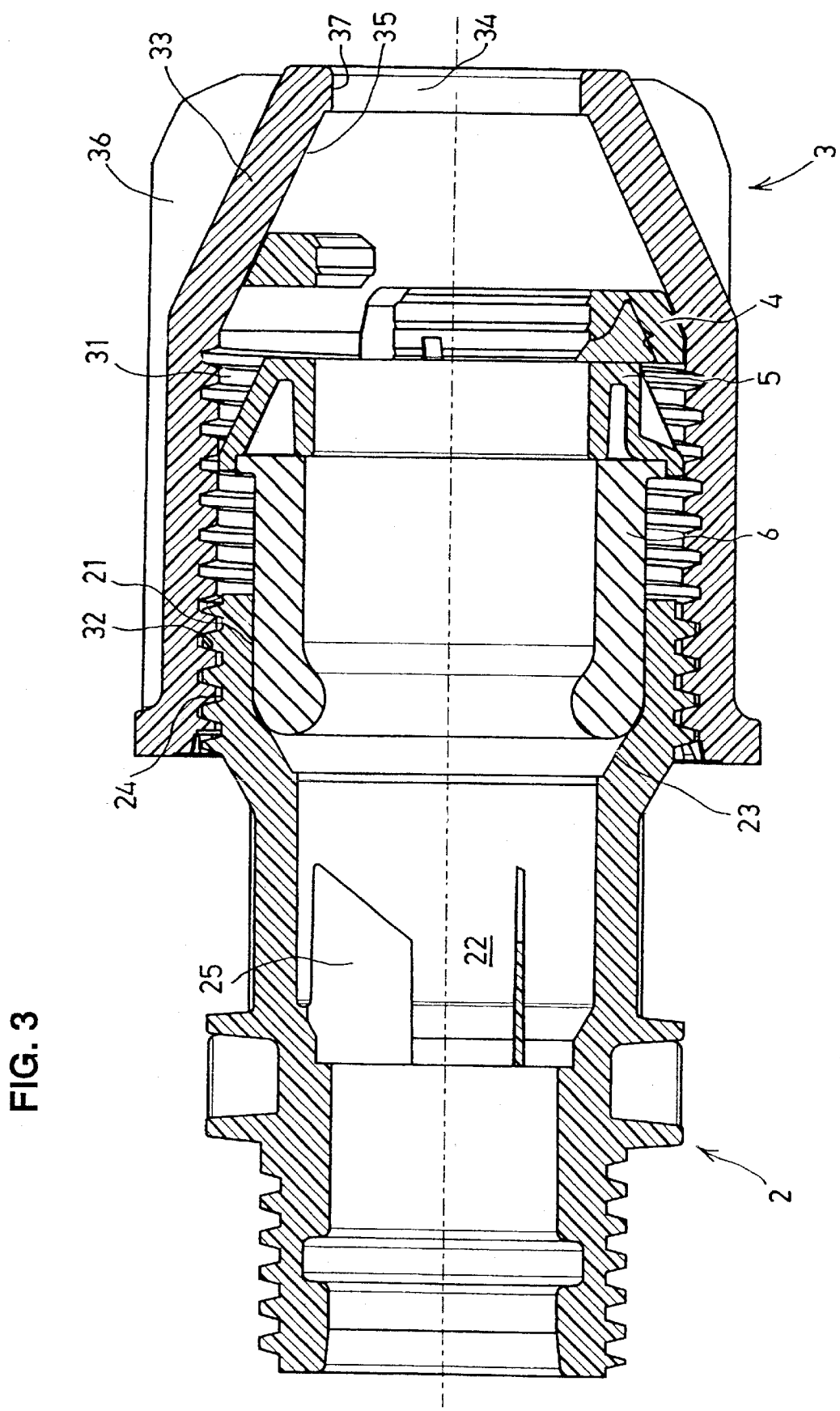
FIG. 3 is a sectional view, along III—III of FIG. 2.

Body member 2 is formed with a large-diameter outer bore 21 (FIGS. 3 and 12) for receiving the pipe P (FIG. 1) to be coupled. Bore 21 communicates with a small-diameter inner bore 22 conducting the fluid of the pipe to another pipe or other device, according to the particular application of the pipe coupling. The juncture between bores 21 and 22 is formed with a conical surface 23 which cooperates with the sealing ring 6, as will be described more particularly below. External threads 24 formed at one end of the body member threadedly receive the nut 3.

Figure 12:
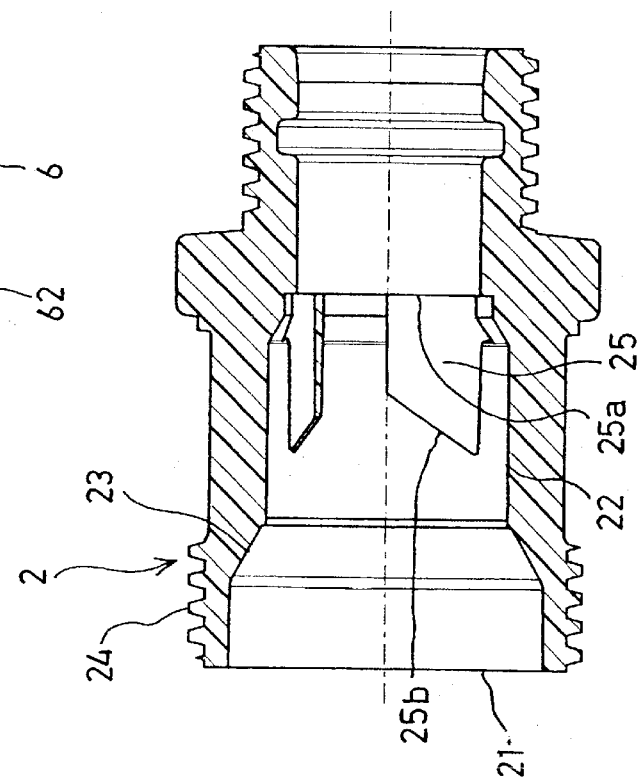
FIG. 12 is a sectional view along line XII—XII of FIG. 11.
Figure 11:
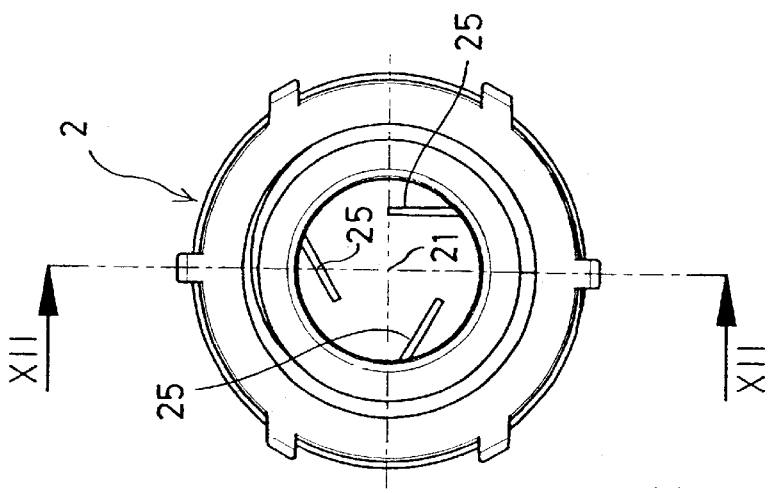
FIG. 11 is an end view of the body member in the pipe coupling of FIGS. 1–3.

As shown particularly in FIGS. 11 and 12, body member 2 further includes a plurality of deformable stops 25 within the inner bore 22. Stops 25 are preferably integrally formed with body member 2, but could be separate inserts received within the body member. The stops are engageable with the end of the pipe P when inserted into the coupling, and are deformable under a force, as will be described more particularly below, to permit some inward axial movement of the pipe during the final tightening of the nut 3.

As shown in FIG. 11, there are three deformable stops 25 equally spaced around the circumference of the inner bore 22. Each stop 25 is in the configuration of a vane having a base 25a integrally joined to the body member 2 and projecting non-radially (i.e., somewhat tangentially) into bore 22. Each vane 25 further includes a tapered leading edge 25b engageable with the end of the pipe P when inserted into bore 23. As described more particularly below, each vane 25 thus serves as an initial stop for limiting the inward movement of the pipe when inserted into the body member, but the final tightening of the nut 3 produces an axial force tending to move the pipe further inwardly of the bore, which further movement is permitted by the deflection of the vanes 25 more tangentially towards the inner surface of the bore. This further inward movement of the pipe during the final tightening of the nut is important to firmly press the sealing ring 6 against conical surface 23 of the body member 2, and thereby to assure a good seal with respect to the coupled pipe.

Nut 3 is formed with a large-diameter bore 31 for accommodating the split ring 4, abutment ring 5, and sealing ring 6. One end of nut 3 includes internal threads 32 for threadedly receiving the external threads 24 of body member 2. The opposite end 33 of nut 3 is reduced in diameter and terminates in a bore 34 for receiving the pipe P. End 33 of the nut is further formed with an inner conical surface 35 cooperable with the elastic split ring 4 for clamping the split ring onto the pipe P, and with outer axial ribs 36 to facilitate manually rotating the nut with respect to the body member 2. The inner conical surface 35 terminates in an annular rib 37 defining bore 34.

The elastic split ring 4 is more particularly illustrated in FIGS. 4–6. It is not of the conventional construction of elastic split rings wherein the opposite ends of the split are aligned so as to have an abuttable relatioship. Rather, the opposite ends 41, 42 of split ring 4, defining the split in the ring, are laterally offset from each other, in the unstressed condition of the split ring. The overlapping ends of the split ring have flat inner and outer faces which engage andslide over each other during the tightening of the nut 3. This action, together with the engagement of the flat outer face of the split ring 4 with the abutmant ring 5 during the tightening of the nut 3 permits the split ring to be substantially compressed, without twisting even under high axial forces, to substantially decrease its inner diameter by the offset ends 41, 41 moving in overlapping relation to each other (FIG.6), thereby enabling athe split ring to clamp pipes having a wide range of outer diameters.

The opposite end portions of the split ring 4 to be moved into overlapping relation to each other, when the split ring is compresssed, are of less thickness than the non-overlapping mid-portion of the split ring. Preferably, each of the opposite end portions extends for an arc of 60–150°. In FIGS.4 and 6, end portion termination in the end 41 is shown at 4a, end portion terminating in end 42 is shown at 4b, and the non-overlapping mid-portion of the split ring is shown at 4c. In the illustrated example end portion 4a is about 5.0 mm in thickness and extends about 120°, end portion 4b is about 6.0 mm in thickness and extends about 120°; and the non-overlapping mid-portion 4c is 11 mm in thickness and extends for the remaining 120°. In the relaxed condition of the split ring, the two ends portions 4a, 4b may slightly overlap each other.

A first step 4d (FIG. 4) is formed in the large-diameter face of the split ring at the juncture of end portion 4a with the mid portion 4c. A second step 4e (FIG. 6) is formed in the small-diameter face of the split ring at the juncture of end portion 4b with the mid-portion 4c. Forming these junctures as steps maximizes the gripping surfaces of the split ring particularly when gripping small-diameter pipes. The inner annular rib 37 on the nut determines the smallest-diameter pipe capable of being accommodated by the pipe coupling since it limits the compression of the split ring by the conical surface 35.

Split ring 4 is made, e.g., by injection molding, so that the two ends 41, 42 are laterally offset from each other permitting the split ring to be compressed in the manner described above. One or both of the opposite ends 41, 42 of the split ring are formed with a tapered surface, as shown at 41a (FIG. 4), to cause the two ends to shift laterally if aligned when first engaging each other and thereby to enable the split ring to be compressed as described above.

Elastic split ring 4 is formed on its outer surface with a plurality of axially-extending circumferentially-spaced ribs 43, 44, having outer tapered surfaces 43a, 44a which define the outer conical face of the split ring engageable with conical surface 35 of nut 3. In the example illustrated in FIGS. 4–6, there are three thick ribs 43 equally spaced circumferentially of the split ring, and a plurality of thin ribs 44 equally spaced between the thick ribs 43.

Each of the three thick ribs 43 is formed on its large-diameter face, with a slot 45 (FIG. 5) terminating at the inner surface of the split ring. Slots 45 receive inserts 46 (FIG. 7), made of a hard material, such as metal, ceramics or the like. Inserts 46 serve as hard teeth projecting radially inwardly past the inner face of the split ring 4 at circumferentially spaced locations thereof to become embedded in the outer face of a pipe when enclosed and clamped by the split ring. As shown in FIG. 7, each insert 46 is of generally rectangular configuration, having flat side faces 46a, a relatively wide base 46b wedged within slot 45 of split ring 4, and a narrow apex 46c projecting from slot 45 past the inner face of the split ring for engaging the outer surface of the pipe clamped by the split ring. The teeth defined by hard inserts 46 are intended to firmly clamp pipes of hard material, such as of metal or hard plastic.

Split ring 4 is further formed with one or more annular locking ribs 47 (FIG. 4) on its inner face which become embedded in the outer face of a pipe made of a softer material (e.g., plastic, rubber, lead, etc.) when the pipe coupling is used for coupling pipes of such softer materials.

Figure 8:
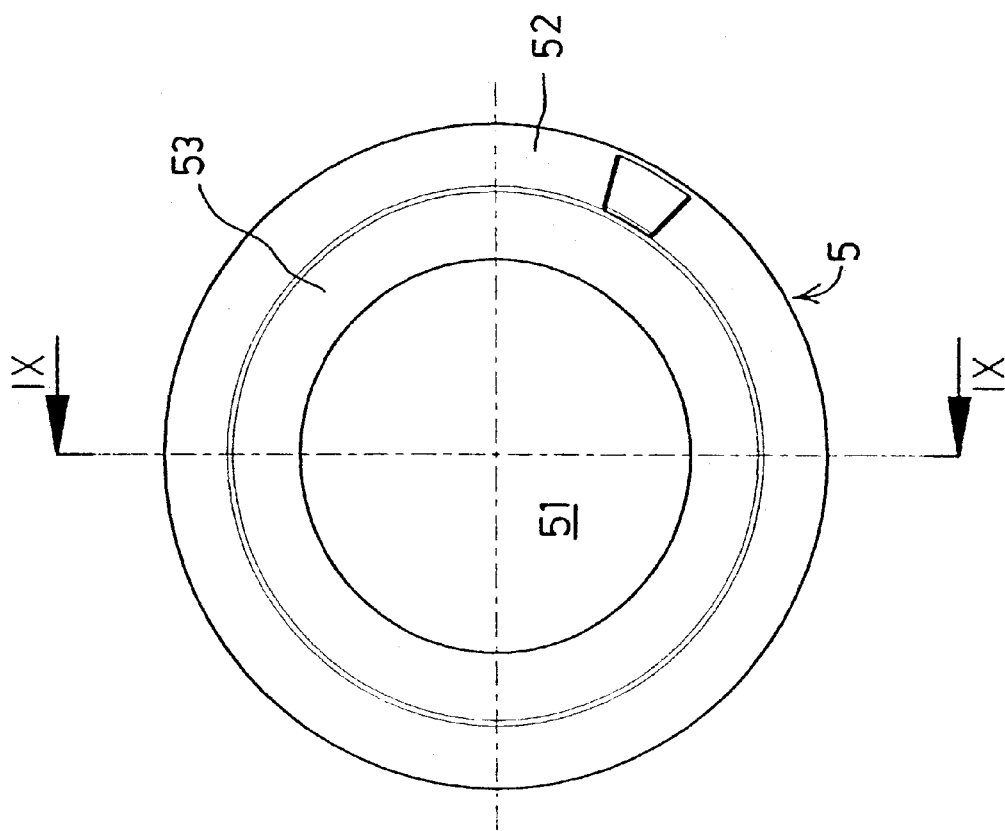
FIG. 8 is a view of the abutment ring in the coupling of FIGS. 1–3 from its smaller-diameter end.
Figure 9:
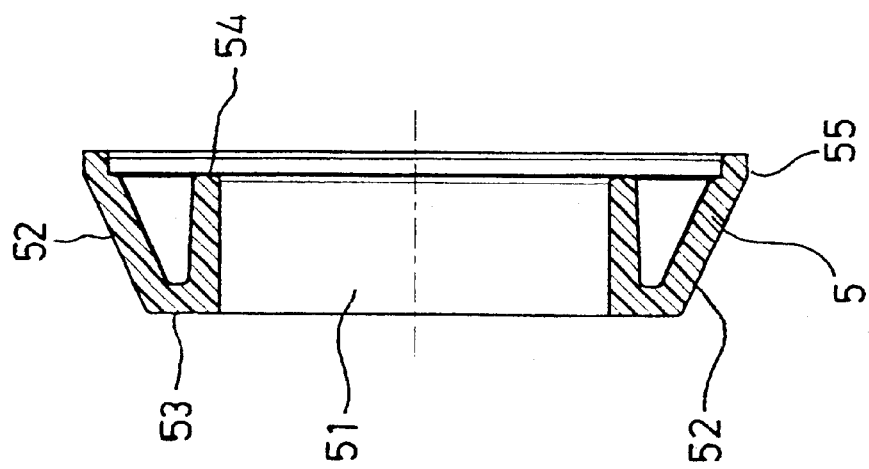
FIG. 9 is a sectional view along IX—IX of FIG. 8.

The abutment ring 5, as best seen in FIGS. 8 and 9, is of rigid plastic material. It is interposed between the elastic split ring 4 and the sealing ring 6 and transfers the axial force, produced by tightening the nut 3, from the split ring to the sealing ring to press the end of the sealing ring into firm sealing engagement with the conical surface 23 of body member 2.

As shown particularly in FIGS. 8 and 9, abutment ring 5 is formed with a central opening 51 for receiving the inserted pipe. The abutment ring has an outer surface 52 of conical configuration extending from the small-diameter end 53 of the ring to the large-diameter end 54. The large diameter end 54 is formed with a peripheral rib 55 for receiving the sealing ring 6.

Figure 2:
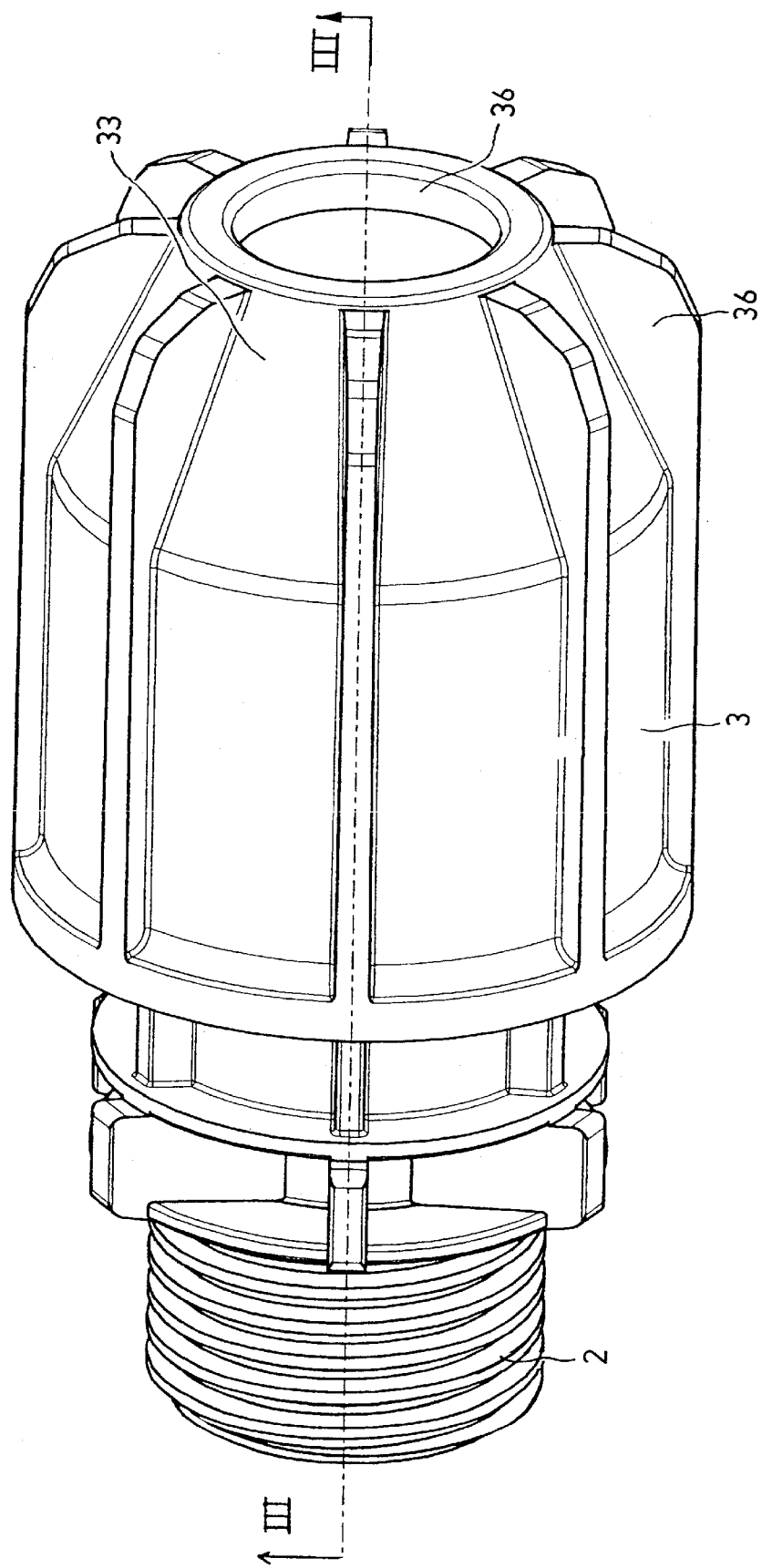
FIG. 2 illustrates the pipe coupling of FIG. 1 in assembled condition.
Figure 10:
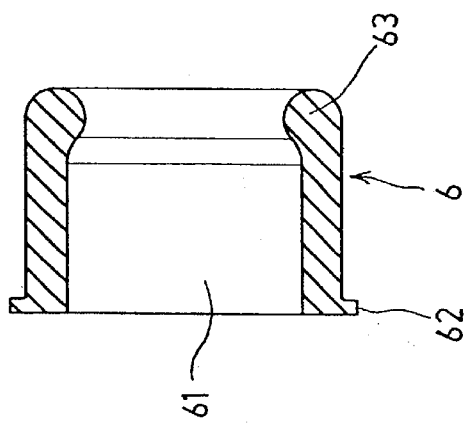
FIG. 10 is a sectional view of the sealing ring in the pipe coupling of FIGS. 1–3.

Sealing ring 6 is of cylindrical configuration and is formed with a central opening 61 (FIG. 10) for receiving the inserted pipe. One end of the sealing ring has an outer radially-extending rib 62 of an outer diameter substantially equal to the inner diameter of peripheral rib 55 on abutment ring 5, for firmly seating that end of the sealing ring on face 54 of the abutment ring. The opposite end of sealing ring 6 is formed with a rounded bead 63 for engagement with the conical surface 23 (FIG. 2) on body member 2.

Figure 13:
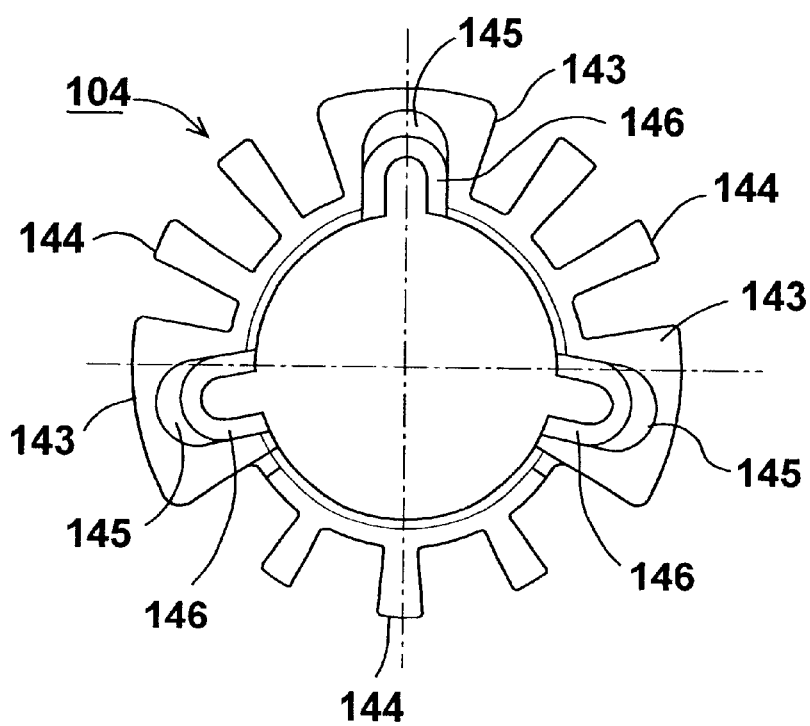
FIGS. 13 and 14 are end and perspective views, respectively, illustrating a modification in the construction of the elastic split ring and its metal teeth inserts.
Figure 14:
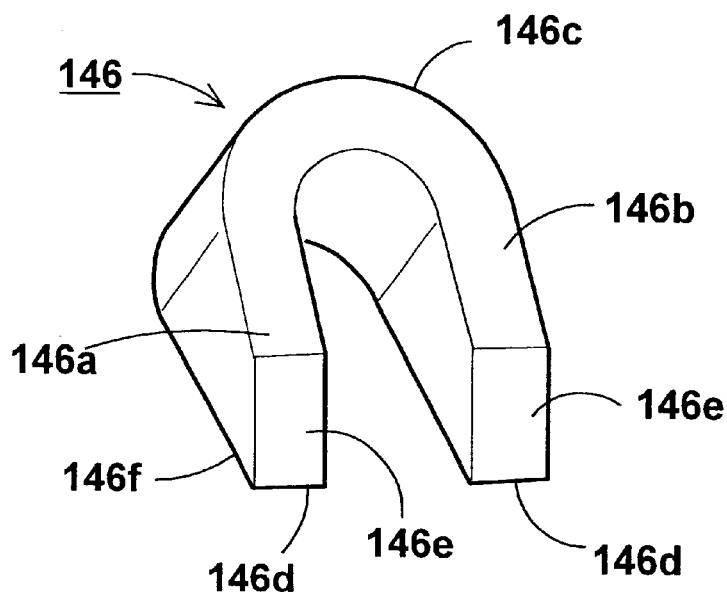

FIGS. 13 and 14 illustrate a slight modification in the construction of the split ring, therein designated 104, and its teeth-defining inserts 146. In this modification, the split ring 104 is formed with U-shaped slots 145 in its large-diameter side. These slots receive U-shaped inserts 146 each including two straight parallel legs 146a, 146b, joined by a curved bridge 146c. Each leg 146a, 146b terminates in a sharp edge 146d projecting inwardly past the inner surface of the split ring 104. The leading face 146e of each tooth is gradually inclined to facilitate insertion of the pipe into the coupling; whereas the opposite face 146f is more sharply inclined to prevent forceful removal of the inserted pipe when applied to the coupling.

The illustrated pipe coupling is used in the following manner:

First, the elastic split ring 4 (or 104, FIGS. 13, 14), the abutment ring 5, and the sealing ring 6, are inserted within nut 3 in the order illustrated in FIG. 1, and the nut is loosely threaded onto threads 24 of the body member 2. The pipe P to be coupled is then inserted through opening 34 of nut 3 until the end of the pipe engages vanes 25 within the body member 2. The nut is then rotated to tighten it.

As nut 3 moves axially with respect to the body member, conical surface 35 of the nut, engaging the outer conical surface of the elastic split ring 4, compresses the split ring, and decreases its inner diameter until it firmly clamps itself on the pipe P. As soon as this occurs, the final tightening rotation of nut 3 causes the clamped pipe P also to move axially and to deform the vanes 25 by deflecting them sidewise. This deflection of the vanes permits further axial movement of the nut 3, and the pipe P, together with the elastic split ring 4, the abutment ring 5, and the sealing ring 6. The axial movement of the sealing ring 6 brings its rounded end 63 firmly against the conical surface 23 of the body member 2, thereby producing a very tight seal with respect to pipe P.

It will thus be seen that the illustrated pipe coupling can accommodate a wide range of outer pipe diameters since the laterally offset ends 41, 42 of the elastic split ring 4 permit the split ring to be considerably contracted over a large range sufficient to clamp the pipe P for the complete 360° circumference of the pipe irrespective of its outer diameter. In addition, the illustrated pipe coupling can be used with pipes of different materials, since the annular inner ribs 47 of the elastic split ring 4 become embedded in pipes of soft material, whereas the hard teeth 46 (or 146), projecting from the inner face of the elastic split ring 4 (or 104), become embedded in pipes of harder material, e.g., metal. The illustrated pipe coupling produces a very good seal since the vanes 25, which limit the initial insertion movement of the pipe P, are deflectable under the force of the final tightening of nut 3 to permit the nut, and particularly the sealing ring 6 within it, to move axially sufficiently to firmly press the rounded end 63 of the sealing ring against conical face 23 of the body member.

While the invention has been described with respect to one preferred embodiment, it will be appreciated that this is set forth merely for purposes of example, and that many other variations, modifications and applications of the invention may be made.

What is claimed is:

1. A pipe coupling, comprising:

a housing including a first section formed with a bore for receiving a pipe to be coupled, and a second section attachable to said first section and movable axially thereof to fix said pipe within said bore;

said second section of the housing being a nut formed with a bore for receiving the pipe to be coupled; said nut being a unitary member formed at one end with threads for attachment to said first section, and being reduced in diameter at its opposite end to define an inner conical face;

and an elastic split ring received within said nut for enclosing the pipe to be coupled, said split ring having an outer conical face engageable with said inner conical face of said nut and effective, upon moving the nut axially to fix the pipe within said bore, to compress the split ring such as to decrease its internal diameter and thereby to cause the split ring to firmly clamp an enclosed pipe;

the opposite ends of said split ring defining the split thereof being laterally offset from each other in the unstressed condition of the split ring, and have flat inner and outer faces, such as to permit the split ring to be compressed to substantially decrease its internal diameter, by said offset ends moving in overlapping relation to each other, thereby enabling the split ring to clamp pipes having a wide range of outer diameters;

wherein said first section of the housing is a body member formed with said bore for receiving the pipe to be coupled; and said split ring is of a plastic material and is formed with a plurality of axially-extending, circumferentially-spaced ribs having outer tapered surfaces defining said outer conical face.

2. The coupling according to claim 1, wherein the opposite end portions of said split ring, to be moved into overlapping relation to each other when the split ring is compressed, are of less thickness than the non-overlapping mid-portion of the split ring.

3. The coupling according to claim 1, wherein the outer edge of at least one of said opposite ends of the split ring is formed with a tapered surface to assure that the opposite ends will shift laterally, and will not abut, upon compression of the split ring.

4. The coupling according to claim 1, wherein said split ring is formed with an annular locking rib on its inner face, which rib becomes embedded in the outer face of a pipe of relatively soft material when enclosed and clamped by the split ring.

5. The coupling according to claim 1, wherein said split ring includes a plurality of hard teeth fixed within at least some of said axially-extending, circumferential-spaced ribs and projecting radially inwardly past the inner face of the split ring at circumferentially spaced locations thereof which teeth become embedded in the outer face of the pipe when enclosed and clamped by the split ring.

6. The coupling according to claim 1, wherein said first housing section is formed with a conical inner surface, and said coupling further includes a sealing ring having an end face engageable with said conical surface of the body member upon tightening the nut.

7. The coupling according to claim 6, wherein said sealing ring is of cylindrical configuration, and said coupling further includes an abutment ring between said elastic split ring and said sealing ring, the outer surface of said abutment ring being of conical configuration, having a small diameter end in abutment with the large diameter end of the split ring, and a large diameter end in abutment with an end of the sealing ring.

8. The coupling according to claim 1, wherein said first housing section is further formed with a plurality of deformable stops circumferentially spaced around the bore inwardly of said conical surface thereof, said stops being engageable with the end of the pipe inserted into the coupling, but being deformable under force to permit inward axial movement of the pipe during the final axial movement of the second housing section after the elastic split ring has become clamped to the pipe.

9. The coupling according to claim 8, wherein each of said deformable stops is in the configuration of a vane having a base integrally joined to the first housing section and projecting non-radially into the bore thereof for engagement with the end of the pipe when inserted into the bore of the body member, said vanes being deflectable towards the inner face of the bore under the force produced during the final axial movement of the second housing section.

10. The coupling according to claim 9, wherein each of said vanes has a tapered leading edge engageable with the end of the pipe when inserted into the first housing section and facilitating the deflection of the vane by the end of the pipe during said final axial movement of the second housing section.

11. A pipe coupling, comprising:
    a housing including a first section formed with a bore for receiving a pipe to be coupled, and a second section attachable to said first section and movable axially thereof to fix said pipe within said bore;
    and an elastic split ring received within said second section for enclosing the pipe to be coupled, said split ring having an outer conical face engageable with an inner conical face of the second section and effective, upon moving the second section axially to fix the pipe within said bore, to compress the split ring such as to decrease its internal diameter and thereby to cause the split ring to firmly clamp an enclosed pipe;
    said first housing section including a plurality of deformable stops circumferentially spaced around the bore, said stops being engageable with the end of a pipe inserted into the coupling, but being deformable under force to permit inward axial movement of the pipe during the final axial movement of the second housing section after the elastic split ring has become clamped to the pipe.

12. The coupling according to claim 11, wherein said first section is a body member formed with said bore for receiving the pipe to be coupled; and said second section is a nut threadedly received on said body member.

13. The coupling according to claim 12, wherein each of said deformable stops is in the configuration of a vane having a base integrally joined to the body member and projecting non-radially into the bore in the body member for engagement with the end of the pipe when inserted into the bore of the body member, said vanes being deflectable towards the inner face of the bore under the force produced during the final tightening of,the nut.

14. The coupling according to claim 13, wherein each of said vanes has a tapered leading edge engageable with the end of the pipe when inserted into the body member and facilitating the deflection of the vane by the end of the pipe during said final tightening of the nut.

15. A pipe coupling, comprising:
    a housing including a first section formed with a bore for receiving a pipe to be coupled, and a second section attachable to said first section and movable axially thereof to fix said pipe within said bore;
    and an elastic split ring received within said second section for enclosing the pipe to be coupled, said split ring being formed with a plurality of axially-extending, circumferentially-spaced ribs having outer tapered surfaces defining an outer conical face engageable with an inner conical face of the second section and effective, upon moving the second section axially to fix the pipe within said bore, to compress the split ring such as to decrease its internal diameter and thereby to cause the split ring to firmly clamp an enclosed pipe;
    said split ring including a plurality of hard teeth fixed within at least some of said axially-extending, circumferentially-spaced ribs and projecting radially inwardly past the inner face of the split ring, at circumferential spaced locations thereof, which teeth become embedded in the outer face of a pipe when enclosed and clamped by the split ring.

16. The coupling according to claim 15, wherein said first section is a body member formed with said bore for receiving the pipe to be coupled; and said second section is a nut threadedly received on said body member.

* * * * *